DIRECT KEY CALLING TELEPHONE STATION HAVING BINARY CONVERTING MEANS

Filed June 18, 1964 2 Sheets-Sheet 1

INVENTORS
Angelo Vaccaro
Harold F. E. Dixon
BY Johnson and Kline
ATTORNEYS

INVENTORS
Angelo Vaccaro
BY Harold F.E. Dixon
Johnson and Kline
ATTORNEYS

United States Patent Office 3,328,533
Patented June 27, 1967

3,328,533
DIRECT KEY CALLING TELEPHONE STATION HAVING BINARY CONVERTING MEANS

Angelo Vaccaro, Port Washington, and Harold F. E. Dixon, Douglaston, N.Y., assignors to Columbia Ribbon and Carbon Manufacturing Co., Inc., Glen Cove, N.Y., a corporation of New York

Filed June 18, 1964, Ser. No. 376,145
16 Claims. (Cl. 179—18)

The present invention relates to a telephone station which is interconnectible with a selected similar station to enable communication between the two stations by manual operation of selected keys or push buttons and more particularly to such a station by which one of a relatively large number of other stations may be called.

In the hereinafter disclosed embodiment of the invention, there are a plurality of telephone stations, each being substantially identical, with the many stations being interconnected to form what may be termed a private telephone system. Such a system has particular utility when used throughout a manufacturing area wherein there are a number of telephone stations positioned throughout the area and with the system having a dial or push buttons which enable each station to call another station in the system.

While such private systems have heretofore been suggested, they have not been found completely satisfactory. One prior system utilized a rotatable dial for calling other stations and thus employed a plurality of stepping switches but it has been found that such a system has a tendency, by reason of the use of stepping switches, not only to be slow in operation but also to be subject to malfunctioning and to be adversely affected by abnormal environmental conditions. Additionally, other systems, which may for example employ push buttons to call other stations, have been inherently limited to the number of other stations which a few push buttons could call and thus such a system has been found to consist of too few stations to satisfy many applications.

It is accordingly an object of the present invention to provide a telephone station that is connectible into a system with other similar stations in which for only a few selectable keys or push buttons, one of a relatively large number of other stations may be called to effect communication therebetween.

Another object of the present invention is to provide a telephone station which avoids the use of stepping switches and is reliable and durable in use by reason of the employment of switches having only "on" and "off" positions.

A further object of the present invention is to provide a key calling telephone station in which the keys consist merely of momentarily operated push switches and yet in which the station is exceedingly rapid in obtaining communication with another station which is selected by the operation of certain key or keys.

Another object of the present invention is to provide a telephone station which achieves the above objects but yet requires only three connections or leads to the key calling portion of each telephone station but yet which enables it to call any one of a large number of other stations.

In carrying out the present invention, it will be understood that there are a plurality of key calling telephone stations that are interconnected together to enable each station to call any other stations and hence form a telephone system. More particularly, each station includes a receiver having the usual earphone and mouthpiece, together with a bell which upon ringing indicates that said station is being called by another station. For enabling one station to call another station in the system, the present invention provides for a plurality of similar keys or momentarily actuated push switches, each of which represents a decimal number with each of the stations being assigned a different decimal call number. The keys however are interconnected in such a manner that they produce a binary notation of the decimal number of the key operated in three wires connected thereto. The binary notation is subsequently utilized to control, what is termed, a relay tree consisting of a plurality of relays having single pole double throw switches, with the switches being arranged to convert the binary notation in the three wires into a decimal number that is the same as the decimal number of the key operated.

In addition, in order to provide for many more stations to be called, the telephone station of the present invention uses the same keys to enable calling a two-digit decimal station. This is achieved by causing a second binary notation of the second digit of the decimal number to appear in the wires and such notation is utilized to shift the state of a second relay tree of SPDT switches thereby interconnecting the subscriber's telephone station with the station having the two-digit decimal number called.

With the above construction, it will be appreciated that with only seven keys such a system is capable of having 56 or 63 stations, the former number of stations being preferred, as will hereinafter be apparent, and yet only require three leads to the key calling portion of the telephone at each station to enable it to call any other station of the system.

Other features and advantages will hereinafter appear.

Figure 1:
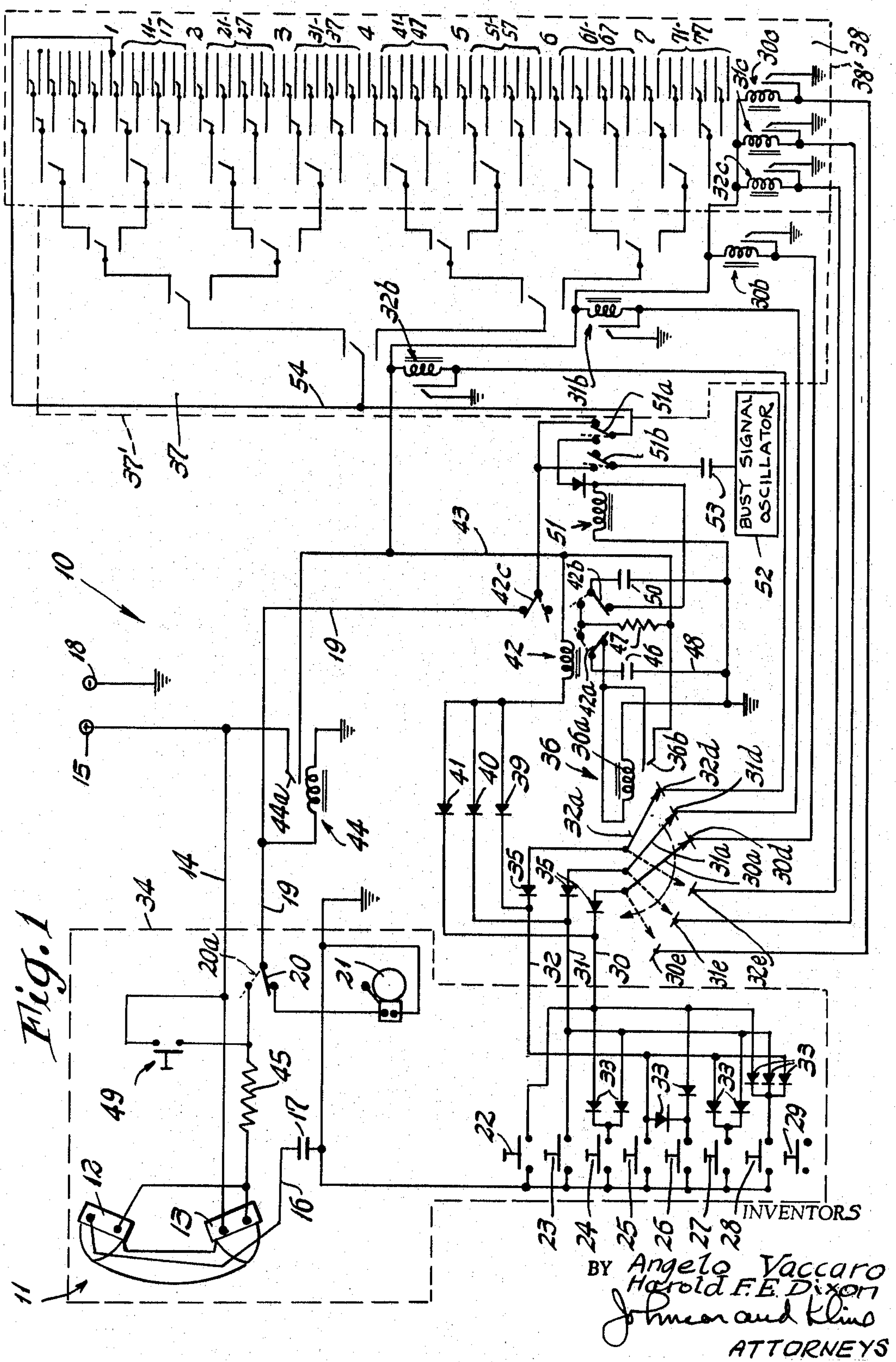
FIGURE 1 is an electrical schematic diagram of a telephone station having a key calling system according to the present invention.

Referring to the drawing, a telephone station, shown schematically in FIG. 1, is generally indicated by the reference numeral 10 and is substantially identical to other telephone stations that may be interconnected to form a telephone system. The station 10 includes a receiver 11 having a speaker 12 and a microphone 13. The microphone 13 is connected to a lead 14 that is connected to a terminal 15 which constitutes the positive side of a direct current power supply while another lead 16 is connected from the speaker 12 through a blocking condenser 17 to the ground or negative terminal 18 of the power supply. In addition, there is provided an information carrying lead 19 connected to both the speaker 12 and microphone 13 and on which the communication between station 10 and the called station is carried.

The receiver 11 is normally positioned on a hook or stand (not shown) which in its rest position maintains a switch 20 in its solid line position to interconnect an electric bell 21 between the information lead 19 and the negative terminal 18. When the receiver is removed from its stand for use, the switch 20 assumes the dotted line position 20*a*.

In accordance with the present invention to enable station 10 to call any one of the other stations connected in the system, there is provided a plurality of keys or momentary push button switches 22, 23, 24, 25, 26, 27, 28 and 29, each of which (except 29) has one terminal connected to the negative terminal 18. The other terminal of each of the keys (except 29) is connected to a plurality, specifically three wires 30, 31 and 32. Each of the keys 22 through 28, 29 not being presently used for reasons which will hereinafter be apparent, is interconnected by diodes, generally indicated by the reference numeral 33, to produce in the leads 30, 31 and 32 a condition in the leads which is representative in binary notation of the decimal number of each key 22 through 28. In binary notation the condition 0 for each lead 30, 31 and 32 is indicated by an open circuit while the condition 1 is indicated by a closed circuit of the lead and its connection to the negative terminal 18.

The key 22 represents the decimal digit 1, 23 the digit 2, 24 the digit 3, 25 the digit 4 etc. with 28 being representative of the digit 7. Thus operation of the key 22 closes the circuit of lead 30 only; key 23 closes the circuit of lead 31 only; key 24 closes the circuits of leads 30 and 31; key 25 closes the circuit of lead 32 only; key 26 closes the circuits of leads 30 and 32; key 27 closes the circuits of leads 31 and 32; and key 28 closes the circuits of all three leads. Thus it will be appreciated that the lead 30 is representative of the last digit of a three-digit binary number; lead 31 of the middle digit and the lead 32 the first digit. The heretofore described components of the telephone station of the present invention are enclosed within a dotted line 34 and constitute the components which are positively at the subscriber's station. The remaining components of the system are preferably mounted at a central location which would include all the other identical remaining components of the other stations.

It will thus be appreciated that connected to the subscriber's station for the key calling system are only the three leads, namely 30, 31 and 32 and of course the three leads connected to the receiver 12, namely 14, 16 and 19.

The three leads 30, 31 and 32 are each connected through a blocking diode 35 to contact arms 30*a*, 31*a*, and 32*a* of a relay switch 36 and are normally in their solid line position shown but are movable to their dotted line position upon energization of the relay coil 36*a*. The solid line position of the contact arms 30*a* through 32*a* interconnects the leads 30, 31 and 32 to relays 30*b*, 31*b* and 32*b* respectively, the latter relays constituting a part of a first relay tree 37 enclosed within the dotted line 37′. Each of the relays in the relay tree 37 operates at least one SPDT switch, with the relay 32*b* operating only one switch, the relay 31*b* operating 2 switches and the relay 30*b* operating 4 SPDT switches, with the normal, i.e. relay unenergized position of each switch contact arm being shown by a solid line.

Connected in series with the tree 37 is another tree 38 enclosed within the dotted line 38′ and including a relay 32*c* operating 82 SPDT switches, a relay 31*c* operating 16 SPDT switches and a relay 30*c* operating 32 SPDT switches. Each of the relays operates the switches vertically aligned therewith and it will be appreciated that the contact arm of one switch (except for those operated by the relay 30*c*) is connectible to the contact arm of two subsequent switches. The relays 30*b*, 31*b* and 32*b* are connected to contacts 30*d*, 31*d* and 32*d* of the relay 36 which are engageable by the contact arms 30*a*, 31*b* and 32*b* respectively when in their solid line position while relays 30*c*, 31*c* and 32*c* are connected to contacts 30*e*, 31*e* and 32*e* to be engageable by the contact arms 30*a*, 31*a* and 32*a* respectively when the latter are in their dotted line positions.

In order to enable a two-digit decimal number station to be called by the use of the keys 22–28 inclusive, it being appreciated that the solid line position of the contact arms 30*a*, 31*a* and 32*a* is sufficient to dial a one-digit number, there is provided an energizing circuit for the relay 36 which becomes effective upon the release of one operated key 22–28 that calls the first digit of the two decimal digit station being called by the station 10. The energizing circuit for the relay 36 includes diodes 39, 40 and 41 connected to the leads 32, 31 and 30 respectively and connected in parallel to a coil of a relay 42 which through a lead 43 is connected to the positive terminal 15 through a relay operated switch 44*a* of a relay 44. The switch 44*a* is closed by energization of its coil which occurs when the receiver 11 is removed from its stand for use by a circuit that includes elements 14, 13, 20*a*, 19 and 18 and a resistor 45.

With the switch 44 closed and with a closure of any one of the keys 22–28, at least one of the leads 30, 31 or 32 will be connected to the negative terminal 18 and current may pass through the relay 42, any one of the diodes 39, 40 and 41 and their respective leads 30, 31 and 32 and the depressed key to the negative terminal 18. When this occurs, the switch arm 42*a* of the relay 42 assumes its dotted line position which connects a condenser 46 through a resistance 47 to the positive lead 43 effecting a charging of the condenser 46, the negative side thereof being connected by a lead 48 to the negative terminal 18. Upon release of the key depressed for the first digit called, the relay 42 becomes deenergized, the switch arm 42*a* assuming its solid line position and the charged condenser 46 is then connected to the relay coil 36*a*. It discharges through the coil to cause the relay 36 to be sufficiently momentarily energized to enable its holding circuit switch 36*b* to become closed and maintain the coil energized by current from the lead 43. The relay 36 is thus energized and its contact arms 30*a*, 31*a* and 32*a* assume their dotted line position and thus maintain engagement between the contacts 30*e*–32*e* and contact arms 30*a*–32*a*. It will be appreciated that the relay 42 is only energized while a key is depressed but as the condenser 46 only requires a momentary connection to the positive lead 43 to become charged, only an almost instantaneous depression of a key is required to effect the charging of the condenser 46 and the subsequent energization of the relay 36 upon release of the key.

With the last-noted position of the contact arms, a calling of the second digit of the decimal number of the station desired to be called may thus be effectuated by depressing the proper decimal number key 22 through 28 to produce in the leads 30 through 32 the binary notation representative of the decimal number which in turn will cause actuation of one or more of the relays 30*c*–32*c*.

After completing the calling of the desired station the present invention provides for an independent control over the ringing of the call station by the use of a push button 49 which when actuated produces in the called station, a ringing of its bell 21.

In the event that the called station is being used for communication with a station other than the calling station, i.e. it is "busy," there is provided a signal for the calling station 10 which indicates that such a line is busy and which also prevents the communication of the station 10 with the called station. To this end, the relay 42 has a second contact arm 42*b* and a third contact arm 42*c*. In the energized condition of the relay 42, the arms are in their dotted line position so that the contact arm 42*b* connects a condenser 50 through the resistance 47 to the positive lead 43 while the contact arm 42*c* opens the information line 19. The contact arm 42*b* in its solid line (relay 42 energized) position connects the condenser 50 to a relay 51 having contact arms 51*a* and 51*b*.

It will be appreciated that when the first digit of the called station is called by the first digit key being closed and also when calling the second digit of the called station by the closing of the proper key, that in both instances the relay coil 42 is energized effecting movement of the contact arm 42*b* to its dotted line position which connects the condenser 50 to the positive lead 43. Upon release of either the first digit key or the second decimal digit key, if a one or a two-digit number station is being called, if the called station is busy, a busy signal is indicated to the calling station, as will be hereinafter appreciated, from a busy signal oscillator indicated by the reference numeral 52 through a condenser 53.

The station shown in FIG. 1 has been for the purposes of illustration given the decimal call number 1 and thus there is a lead 54 connected from the "1" terminal of the output of the second tree 38 to the information lead 19 to enable input calls to bypass the two trees of this station.

Figures 2, 3:
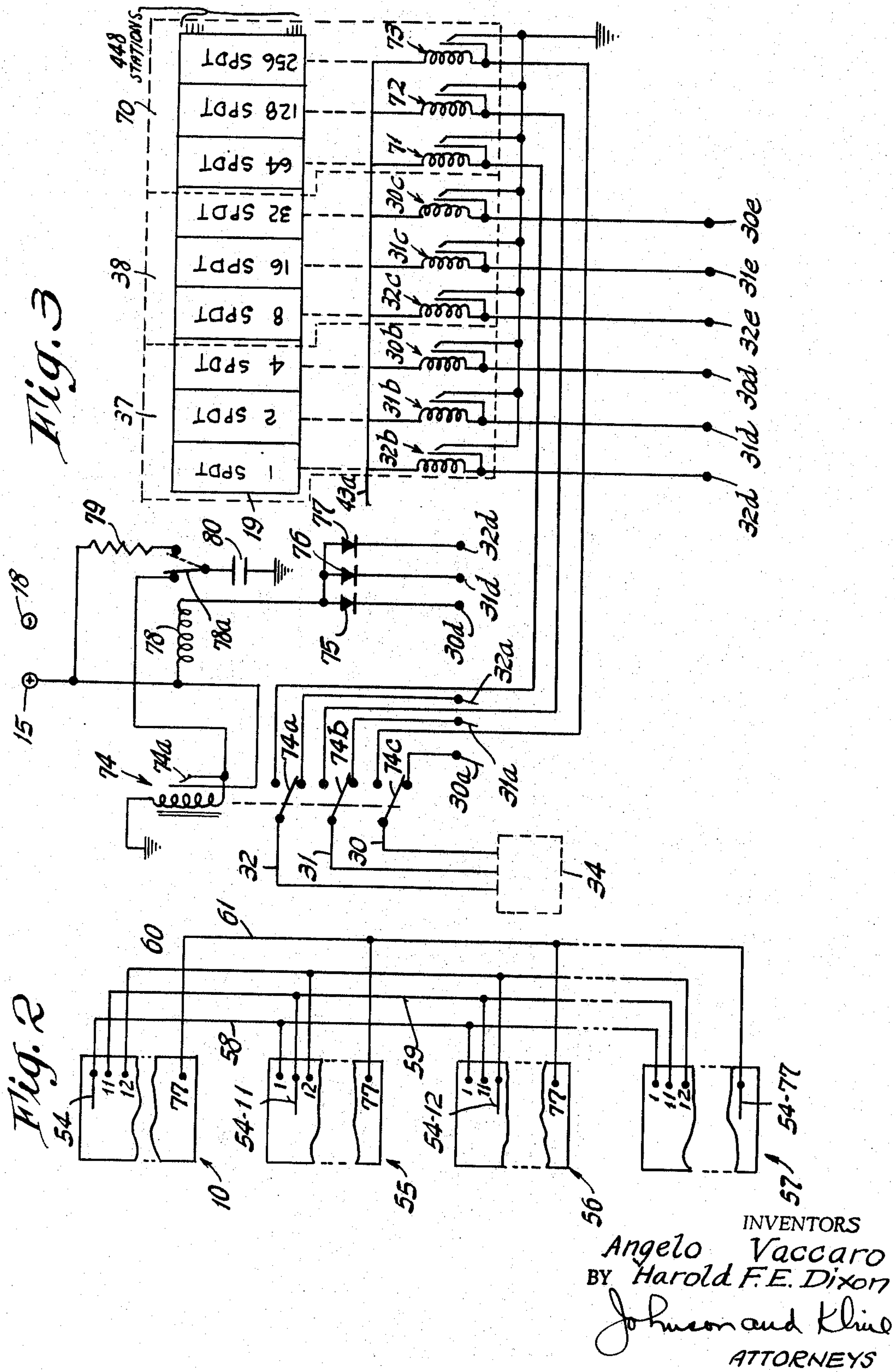
FIG. 2 is an illustrative diagram, partly in block form, showing the manner of interconnecting different stations of the type shown in FIG. 1 to form the system.
FIG. 3 is a schematic diagram, partly in block form, illustrating a station whereby a system may be formed to include stations having three decimal digit call numbers, thus substantially increasing the number of stations in the system which each one of the stations may call.

The first relay tree 37, as shown in FIG. 1, is capable of calling stations having decimal numbers 1 through 7 inclusive, 11–17 inclusive, 21–27 inclusive etc. to 71–77 inclusive. In FIG. 2, a block diagram indicating the interconnection between stations, there are shown four stations of the 56 stations that may be interconnected to form the system. The station having the decimal call number 1 is again indicated by the reference numeral 10, the station having the decimal call number 11 by the reference numeral 55, the station having the decimal call number 12 by reference numeral 56 and the station having the decimal call number 77 by the reference numeral 57. The station 10 has the incoming line 54 connected as shown while the station indicated by reference numeral 56 has a similar line 54–11, the station indicated by the reference numeral 56 also has an incoming line 54–12 and the station 57 having decimal number 77 an incoming line 54–77.

All stations are interconnected to form the system by a plurality of leads, each of which is connected to the similar tree output terminals of each station to place them in parallel. Thus station 10 has its terminal denoted 1 connected in parallel to the identical 1 terminal of the stations 55, 56 and 57 by a lead 58. Similarly station 55 having the decimal call number 11 is interconnected to a lead 59 which connects all the 11 terminals of the stations in parallel, while a lead 60 connects all the 12 terminals of the stations in parallel and a lead 61 connects all the 77 terminals in parallel.

While in the present embodiment each of the stations has its own tree, it will of course be appreciated that if desired the number of trees may be reduced by including a stepping circuit which searches for an unused tree.

It will thus be understood that each of the stations in the system are identical, the only difference being that in each station, the incoming lead that corresponds to lead 54 of station 10 is connected to the terminal in the second tree that corresponds to each station's decimal call number.

In the operation of the key calling telephone system of the present invention in order to call another number, presupposing that the number desired to be called by the station 10 shown in FIG. 1 having the call number 1 is a station having the call number 47, the user removes the receiver 11 from its rest position which causes contact arm 20 to assume the position **20*a*, energizing the relay 44 to close switch 44*a* and connect the positive lead 43 to the positive terminal 15. Also the positive terminal is connected to a lead 43*a*, the latter being connected to the relays 30*b*–32*b* and 30*c*–32*c*. The user then depresses the key 25 that corresponds to the decimal digit 4 which provides a closed circuit to the negative terminal 18 only through the lead 32 and not through the other leads 31 and 30, thus representing the decimal digit 4 by the binary code 100. The relay coil 32*b* becomes energized through the contact arm 32*a* and contact 32*d* and it is maintained energized by its holding circuit 32*e*, each of the other relays 31*b*, 30*b* and 30*c*–32*c*** also having a holding circuit denoted by the reference characters *f* and *g* respectively. Additionally, while the key 25 is depressed, even momentarily, there is a path established through the relay coil 42 and the diode 41 which causes energization of the relay 42, a movement of the contact arm **42*a* to its dotted line position to effect charging of the condenser 46 through the resistance 47. Additionally, the condenser 50 is charged in a similar manner by the switch arm 42*b*** being in its dotted line position.

Upon the operator ceasing depression of the key 25, it opens the circuit in the lead 32 which deenergizes the relay 42 and connects the condenser 46 through the solid line position of the contact arm **42*a* to the relay coil 36*a* effecting momentary energization thereof. However, this is sufficient to effect closing of the holding circuit switch 36*b* which maintains the relay 36 energized and causes the contact arms 30*a*–32*a*** to move to their dotted line position.

The operator then depresses the key 28 representative of the decimal number 7, the second digit of the called station, causing each of the lines 30, 31 and 32 to be connected to the negative ground to thereby represent the decimal number 7 by the binary code 111. This energizes the relays **30*c*, 31*c* and 32*c* to cause each of their contact arms in the relay tree 38 to shift to be inclined downwardly. More specifically, the contact arms 32*h*, 31*h*, 30*h* are caused to assume their dotted line position. Thus a circuit is established from the information lead 19 through the switch arm 42*c*, switch arm 51*b*, contact arms 32*f*, 31*f*, 30*f*, 32*f*, 31*f* and 30*f* to the terminal 47 of the tree 38. As all the terminals 47 of each station are connected in parallel, a signal will be transmitted to all such terminals but only station number 47, by reason of its incoming lead corresponding to the lead 54 of station 10, will accept it. If station 47 is not busy then a connection will be made to leads identical to the leads 54 and 19 of the station 10 of the called station number 47. Operation of the bell ringing button 49 enables current to flow through the information lead 19, contact arms 42*c*, 51*a*, 30*i*–32*i* and 30*h*–32*h*, through the line equivalent to lead 54 and 19 of the station being called, i.e. 47, to cause ringing of the bell of the station numbered 47. Upon the called station having its receiver taken from its stand, communication is then established along the same path. Upon completion of the call by either the receiver 11 or the called station receiver being placed on its stand, the contact arm 20*a* assumes its full line position deenergizing the relay 44 to open switch 44*a*, deenergizing the leads 43 and 43*a*** to thereby return all the relays to their solid line, normal position.

In the event that the station being called, i.e. 47, is engaged in communication with another station, i.e. busy, then current flows from the station 47 through the contact arms **30*h*–32*h* and 30*i*–32*i* to the contact arm 51*a*. As heretofore explained, the condensers 46 and/or 50 are both charged during the time that any one of the keys 22–28 is depressed and upon release of the depressed key, the charged condenser 50 effects a momentary energization of the relay 51 causing the switch arms 51*a* and 51*b* to assume their dotted line position. Thus if during this momentary position of the contact arm 51*a* the station number 47 is busy, current will flow from the called station through the dotted line position of the contact arm 51*a*, the relay coil 51*c* to the negative terminal 18. Such a current is sufficient to maintain the relay 51 energized and the contact arms 51*a* and 51*b* in their dotted line position. In this position, the information lead 19 is disconnected from the relay trees 37 and 38 and is connected by the contact arm 51*b* through the condenser 53 to the busy signal oscillator 52 thus producing to the user of station 10 a busy signal. The busy signal continues until station 10** is unable to receive current from station 47 and said current ceases, only when the user of station 47 ceases its communication with another station.

In order to assure that the user of station 10 cannot be connected to the station numbered 47 during the time that one of the keys 22–28 is depressed and thus "listen in" to station 47 by maintaining such key depressed, there is provided the contact **42*c* connected to the relay 42 which during energization of the relay 42 is placed in its dotted line position, thus disconnecting the information lead 19 from the relay trees. Upon keys 22–28 being released, the contact arm 42*c* returns to its solid line normal position. However, the condenser 50 causes momentary energization of the relay 51 and the maintenance thereof through contact arm 51***a*, if the station numbered 47 is busy, with the production of a busy signal to the user of station 10 through contact arm 51*b*. It has been found that a diode 62 positioned in the connection to the relay 51 serves to minimize the current flow from the station numbered 47 thus minimizing interference with the communication therein and in addition preventing discharge of the condenser 50 into the connection to the station numbered 47.

In the specific embodiment of the invention herein described the relay trees 37 and 38 are connected in series with the first tree 37 being responsive to the first digit of a two-digit number and the second tree 38 being responsive to the second digit of a two-digit decimal number and thus only 56 stations may be interconnected. However, this arrangement has been found exceedingly desirable as it permits calling just a one-digit number without requiring the operation of any other subsequent or previous key. For example, if the relay trees were connected such that the relay tree 38 is operated by the first digit of a two-digit decimal number and the relay 37 by the second digit, 63 stations could be interconnected in the system. However, though a single digit, i.e. 1–7 decimal numbered station could be called, in order to dial a two-digit number the last digit would be required to be dialed first and then the second digit dialed last. Thus in calling station 47, the key 7 would first be depressed and then the key 4. If the relay trees are connected in the manner shown and it is desired to have 63 stations, then in order to dial a station having a one-digit number, such as 4, then a zero key (not shown) would be required to be initially operated to energize the relay 36 such that the pressing of the single digit key would then operate the second relay trees 38 and not the first.

While only a system having 56 stations has heretofore been disclosed, it will be appreciated that by the addition of components shown in FIG. 3, a system having 448 stations may be constructed with still only 3 leads to the key calling portion of each station. Referring to FIG. 3, the components that are the same as those of FIG. 1 have been given the identical reference characters and thus there is provided the terminals 15 and 18, first relay tree 37, second relay tree 38 and in addition there is provided a third relay tree 70 that includes a 64, a 128 and a 256 SPDT switch, each provided by a relay 71, 72 and 73 respectively. In addition, there is provided a three SPDT switch relay 74 having contact arms 74*a*, 74*b* and 74*c*. The contact arms 74*a*–74*c* are connected to the leads 32–30 respectively from the subscriber's station 34 while the contact arms 74a–74c in their normal solid line position maintain the connection of the leads 32, 31 and 30 to the contact arms 32*a*, 31*a* and 30*a* respectively.

In addition, there are provided three parallelly connected diodes 75, 76 and 77 respectively connected to the contacts 30*e*, 31*e* and 32*e* and in parallel through a relay 78 to the positive supply 15. The relay coil 78 has a contact arm 78*a* which when the relay 78 is energized connects the positive terminal 15 through a resistor 79 to a condenser 80 and whenever the relay 78 is not energized, to the relay 74. The latter is also connectible through its holding circuit switch 74*d* to the positive terminal 15.

When the second digit of a three-digit decimal number of the called station is being called, a closed circuit through one or more of the diodes 75, 76 and 77 is effective, energizing relay 78 to connect the condenser with the positive terminal 15 and thus charge it. Upon completion of the calling of the second digit, i.e. release of the key, the relay 78 becomes deenergized, shifting contact arm 78*a* to its solid line position which enables condenser 80 to discharge into the relay 74, momentarily but sufficiently energizing it and closing its holding circuit switch 74*d*. This shifts the contact arms 74*a*, 74*b* and 74*c* to their dotted line position, so that the next key 22–28 depressed for the third digit of the three digit decimal number will cause energization of one or more of the relays 71–73 to complete connection through the information lead 19 to the connection of the called station in the 448 station system.

It will be appreciated that in the embodiment shown in FIG. 1 that no decimal number having a zero therein may be selected and this holds true for the three digit embodiment shown in FIG. 3. Thus instead of having 511 stations which may be called, the present invention permits only 448 but yet obviates the necsessity of having a separate circuit or circuits for controlling the digit which the number zero would represent. In both embodiments the rest position is the zero decimal number which is equivalent to also the zero number in the binary system and is the normally rest position of all the SPDT relay switches. In the embodiment shown in FIG. 3, in addition to a three-digit decimal number being capable of being called, both a one or a two-digit number may also be called as in the previously described embodiment.

It will accordingly be appreciated that there has been disclosed a key calling telephone system which enables one of a large number of stations in the system to be called but yet only requires three leads to be connected to the key calling part of each station. Moreover, only a few keys are required, seven specifically, with each key representing a decimal number and with each of the stations having a decimal call number. When calling a station the key calling portion provides for causing a binary notation in the three leads which is representative of the decimal number of the key operated and by the use of a relay tree the binary notation is subsequently transformed back to the decimal number of the called station, thus effecting communication between the calling and called station. For calling the second digit of the decimal number of the station being used, the key corresponding to the second decimal digit is operated and its decimal number in binary notation is effected in the same three wires but is subsequently transformed back to its decimal number. For larger systems, as disclosed in the further embodiment of the present invention, stations having three digit decimal numbers may be interconnected thereby substantially increasing the number of stations in the system without increasing the number of wires required to the key call portion of each station.

In both embodiments, either the two digit or the three digit system, stations may be called which have only a one decimal number or a one and two-digit decimal number respectively without requiring any operation other than the pressing of the key representing each digit. This is achieved by the interconnection of the relay trees and the manner in which the binary notation in the three leads is utilized to control the energization of the trees to transform the binary notation back into the decimal number called.

Variations and modifications may be made within the scope of the claims and portions of the improvements may be used without others.

We claim:

1. A key calling telephone station for calling any one of a plurality of other stations with each station having a decimal call number including a plurality of individually manually operable normally open keys each representative of a different decimal number, means interconnecting the keys to a plurality of wires to produce a binary notation in said wires representative of the decimal number of a key operated, a relay tree constructed and arranged to convert a binary notation into a decimal number and having an input and an output terminal for each decimal call number, means for connecting the plurality of wires to said tree to effect a change therein representative of the binary notation carried by the wires caused by operation of a first key, telephone means including an information line connected to the input of said tree and adapted to be connected through the tree to the output line of the decimal numbered station determined by operation of the key.

2. The invention as defined in claim 1 in which there are seven keys and three wires, the first, third, fifth and seventh key being connected to a first wire; the second, third, sixth and seventh key being connected to the second wire and the fourth, fifth, sixth and seventh key being connected to the third wire.

3. The invention as defined in claim 1 in which the relay tree includes three relays connected in series, a first relay including 1 SPDT switch, the second relay including 2 SPDT switches and the third relay having 4 SPDT switches, said information line being connected to the first relay switch and the output terminals being connected to the third relay switch.

4. The invention as defined in claim 3 in which the plurality of wires includes three wires, each wire being connected to a relay and in which the binary notation of 1 in a wire effects energization of its associated relay.

5. The invention as defined in claim 1 in which there is means for producing a tone, two position means connected to the information line and the tone means, one of said positions effecting connection of the tone means to the information line and electrical opening of the information line and the other of said positions effecting continuity of the information line and means for sensing if the called station is in communication with another station and effecting movement of the two position means from the other position to the one position.

6. A key calling telephone station for calling any one of a plurality of other stations with each station having a different decimal call number including a plurality of individually manually operable normally open keys each representative of a decimal number, means interconnecting the keys to a plurality of wires to produce a binary notation in said wires representative of the decimal number of the key operated, a first tree and a second tree, each of said trees being constructed and arranged to convert a binary notation into a decimal number, means interconnecting the two trees in series with there being an output terminal for each decimal call number and an input, means for connecting the plurality of wires to said first tree to effect a change therein representative of the binary notation carried by the wires caused by operation of the first key, means for shifting the connection of the plurality of wires to the second tree to effect a change therein representative of the binary notation carried by the wires caused by operation of the second key, telephone means including an information line connection to the input of said trees and adapted to be connected through the trees to the output line of the decimal numbered station determined by operation of the keys.

7. A key calling telephone station for calling any one of a plurality of other stations with each station having a decimal call number including a plurality of individually manually operable normally open keys each representative of a decimal number, means interconnecting the keys to a plurality of wires to produce a binary notation in said wires representative of the decimal number of the key operated, a first relay tree and a second relay tree, each of said trees being constructed and arranged to convert a binary notation into a decimal number, means interconnecting the two trees in series with there being an output line for each decimal call number and an input, means for connecting the plurality of wires to said first tree to effect a change therein representative of the binary notation carried by the wires caused by operation of a first key, means for shifting only after the release of the first key the connection of the plurality of wires to the second tree to effect a change therein representative of the binary notation carried by the wires caused by operation of the second key, telephone means including an information line connected to the input of said trees and adapted to be connected through the trees to the output line of the decimal numbered station determined by operation of the keys.

8. The invention as defined in claim 7 in which the means for shifting includes a relay having a two position switch for each wire, a relay operating means connected to said relay and having a first and a second condition with the latter condition energizing said relay and means connected to said wires and said relay operating means to energize said relay operated means for placing said operating means in its first condition only when a key is depressed and in its second condition upon release of the depressed key.

9. The invention as defined in claim 8 in which the relay operating means includes a condenser, the first condition effects charging of the condenser and the second condition effects connection of the charged condenser to the relay to cause momentary energization thereof.

10. A key calling telephone station for calling any one of a plurality of other stations with each station having a decimal call number including a plurality of individually manually operable normally open keys each representative of a decimal number, means interconnecting the keys to three wires to produce a binary notation in said wires representative of the decimal number of the key operated, a first relay tree and a second relay tree, each of said trees being constructed and arranged to convert a binary notation into a decimal number and having a first, second and third relay, means interconnecting the two trees in series with there being an output line for each decimal call number and an input, means for connecting the three wires with each wire being connected to only one of the relays of said first tree to effect a change therein representative of the binary notation carried by the wires caused by operation of a first key, means for shifting the connection of the three wires to the second tree to effect a change therein representative of the binary notation carried by the wires caused by operation of the second key, said means causing connection of one wire to one relay of the second relay tree, telephone means including an information line connected to the input of said trees and adapted to be connected through the trees to the output line of the decimal numbered station determined by operation of the keys.

11. A key calling telephone station for calling any one of a plurality of other stations with each station having a decimal call number including seven individually manually operable normally open keys each representative of a decimal number, means interconnecting the keys to three wires to produce a binary notation in said wires representative of the decimal number of the key operated, said interconnecting means connecting the first wire to the first, third, fifth and seventh keys, the second wire to the second, third, sixth and seventh keys and the third wire to the fourth, fifth, sixth and seventh keys, a first relay tree and a second relay tree, each of said trees being constructed and arranged to convert a binary notation into a decimal number and having a first, second and third relay, means interconnecting the two trees in series with there being an output line for each decimal call number and an input, means for connecting the three wires with each wire being connected to only one of the relays of said first tree to effect a change therein representative of the binary notation carried by the wires caused by operation of a first key, means for shifting the connection of the three wires to the second tree to effect a change therein representative of the binary notation carried by the wires caused by operation of the second key, said means causing connection of one wire to one relay of the second relay tree, telephone means including an information line connected to the input of said trees and adapted to be connected through the trees to the output line of the decimal numbered station determined by operation of the keys.

12. A key calling telephone station for calling any one of a plurality of other stations with each station having a decimal call number including a plurality of individually manually operable normally open keys each representative of a decimal number, means interconnecting the keys to three wires to produce a binary notation in said wires representative of the decimal number of the key operated, a first relay tree and a second relay tree, each of said trees being constructed and arranged to convert a binary notation into a decimal number and having a first, second and third relay, the first, second and third relays of the first tree having 1, 2 and 4 SPDT switches respectively and the first, second and third relays of the second tree having 8, 16 and 32 SPDT switches respectively, means interconnecting the second tree in series with the first tree to have the switches of the third relay of the second tree to provide an output line for each decimal call number and the switch of the first relay of the first tree form an input, means for connecting the three wires with each wire being connected to only one of the relays of said first tree to effect a change therein representative of the binary notation carried by the wires caused by operation of a first key, means for shifting the connection of the three wires to the second tree to effect a change therein representative of the binary notation carried by the wires caused by operation of the second key, said means causing connection of one wire to one relay of the second relay tree, telephone means including an information line connected to the input of said trees and adapted to be connected through the trees to the output line of the decimal numbered station determined by operation of the keys.

13. The invention as defined in claim 12 in which there are seven keys, the first, third, fifth and seventh key being connected to one of the three wires, the second, third, sixth and seventh being connected to the second wire and the fourth, fifth, sixth and seventh being connected to the third wire, said third wire being interconnected to the third relay of each tree, the second wire to the second relay of each tree and the third wire to the first relay of each tree.

14. A key calling telephone station for calling any one of a plurality of other stations with each station having a different decimal call number including a plurality of individually manually operable normally open keys each representative of a decimal number, means interconnecting the keys to a plurality of wires to produce a binary notation in said wires representative of the decimal number of the key operated, a first tree and a second tree, each of said trees being constructed and arranged to convert a binary notation into a decimal number, means interconnecting the first tree in series with the second tree with the second tree providing an output terminal for each decimal call number and with the first tree having an input, means for connecting the plurality of wires to said first tree to effect a change therein representative of the binary notation carried by the wires caused by operation of the first key, means for shifting the connection of the plurality of wires to the second tree to effect a change therein representative of the binary notation carried by the wires caused by operation of the second key, said second tree in the absence of a depression of a key having no change therein whereby a station having a one-digit decimal call number may be called, telephone means including an information line connected to the input of said trees and adapted to be connected through the trees to the output line of the decimal numbered station determined by operation of the keys.

15. A key calling telephone station for calling any one of a plurality of other stations with each station having a different decimal call number including a plurality of individually manually operable normally open keys each representative of a decimal number, means interconnecting the keys to three wires to produce a binary notation in said wires representative of the decimal number of the key operated, first, second and third relay trees, each of said trees being constructed and arranged to convert a binary notation into a decimal number and having a first, second and third relay, means interconnecting the three trees in series with there being an output terminal for each decimal call number, means for connecting the three wires with each wire being connected to only one of the relays of said first tree to effect a change therein representative of the binary notation carried by the wires caused by operation of a first key, means for shifting the connection of the three wires to the second tree to effect a change therein representative of the binary notation carried by the wires caused by operation of the second key, said means causing connection of one wire to one relay of the second relay tree, means for shifting the connection of the three wires to the third tree to effect a change therein representative of the binary notation carried by the wires caused by operation of the third key, said means causing connection of one wire to one relay of the third relay tree, telephone means including an information line connected to the input of said trees and adapted to be connected through the trees to the output line of the decimal numbered station determined by operation of the keys.

16. The invention as defined in claim 14 in which in the absence of the pressing of the second or third key there is no change in the second or third relay trees whereby a station having a one or a two-digit decimal call letter may be called.

References Cited

UNITED STATES PATENTS

| | | | |
|---|---|---|---|
| 2,682,576 | 6/1954 | Selden | 179—18 |
| 3,115,551 | 12/1963 | Plyer | 179—18 |

KATHLEEN H. CLAFFY, *Primary Examiner.*

L. A. WRIGHT, *Assistant Examiner.*